United States Patent

[11] 3,584,448

| [72] | Inventor | Werner William Martinmaas<br>Watertown, S. Dak. |
|---|---|---|
| [21] | Appl. No. | 838,493 |
| [22] | Filed | July 2, 1969 |
| [45] | Patented | June 15, 1971 |
| [73] | Assignee | Patents, Inc.<br>Hayti, S. Dak. |

[54] STRAWBUNCHER
34 Claims, 15 Drawing Figs.

[52] U.S. Cl. .................................................. 56/473.5,
214/519, 56/346
[51] Int. Cl. ...................................................... A01d 75/00
[50] Field of Search ......................................... 56/473, 5,
346, 474—480, 364, 350; 214/500, 501, 508, 518,
519, 520, 521, 522

[56] References Cited
UNITED STATES PATENTS
| 2,541,984 | 2/1951 | Chandler | 56/473.5 |
|---|---|---|---|
| 2,674,840 | 4/1954 | Renelt | 56/473.5 |
| 2,756,887 | 7/1956 | Raney et al. | 214/519 |
| 3,092,272 | 6/1963 | Weigel | 214/501 |
| 3,110,148 | 11/1963 | Mader et al. | 56/347 |

Primary Examiner—Russell R. Kinsey
Attorney—Hofgren, Wegner, Allen, Stellman and McCord ABSTRACT: A fodder bunching apparatus, commonly known as a strawbuncher, comprising a wheeled container adapted to be towed behind a harvesting implement to receive animal fodder from the implement as they move about a field. The container has a normally idle apron or ladder type conveyor on its floor to feed collected material out the open rear end of the container intermittently in response to the opening of a barricade which normally closes the rear end; and an infeed auger conveyor receives material from the harvesting implement and scatters it along the container floor where it collects for intermittent discharge.

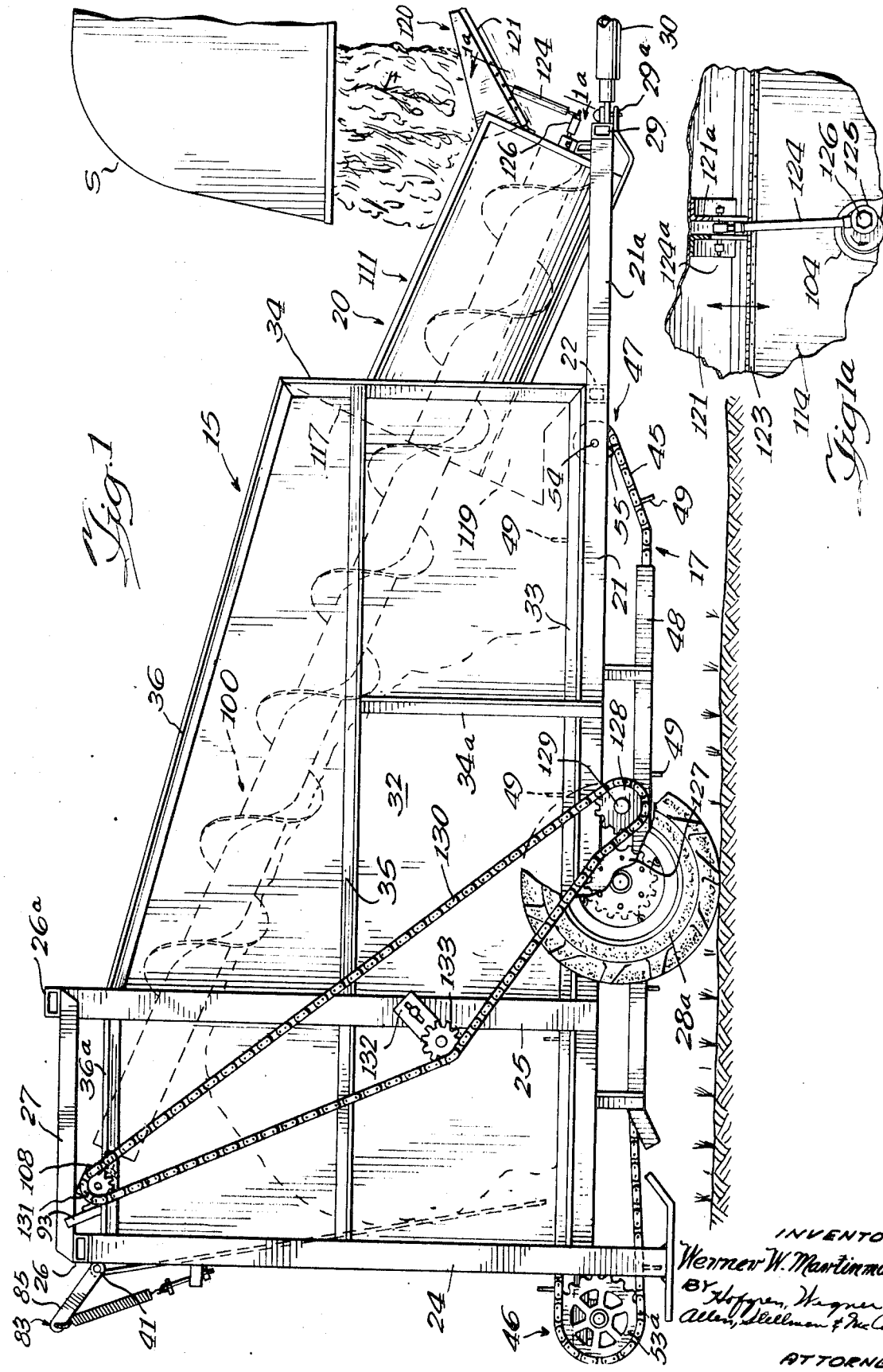

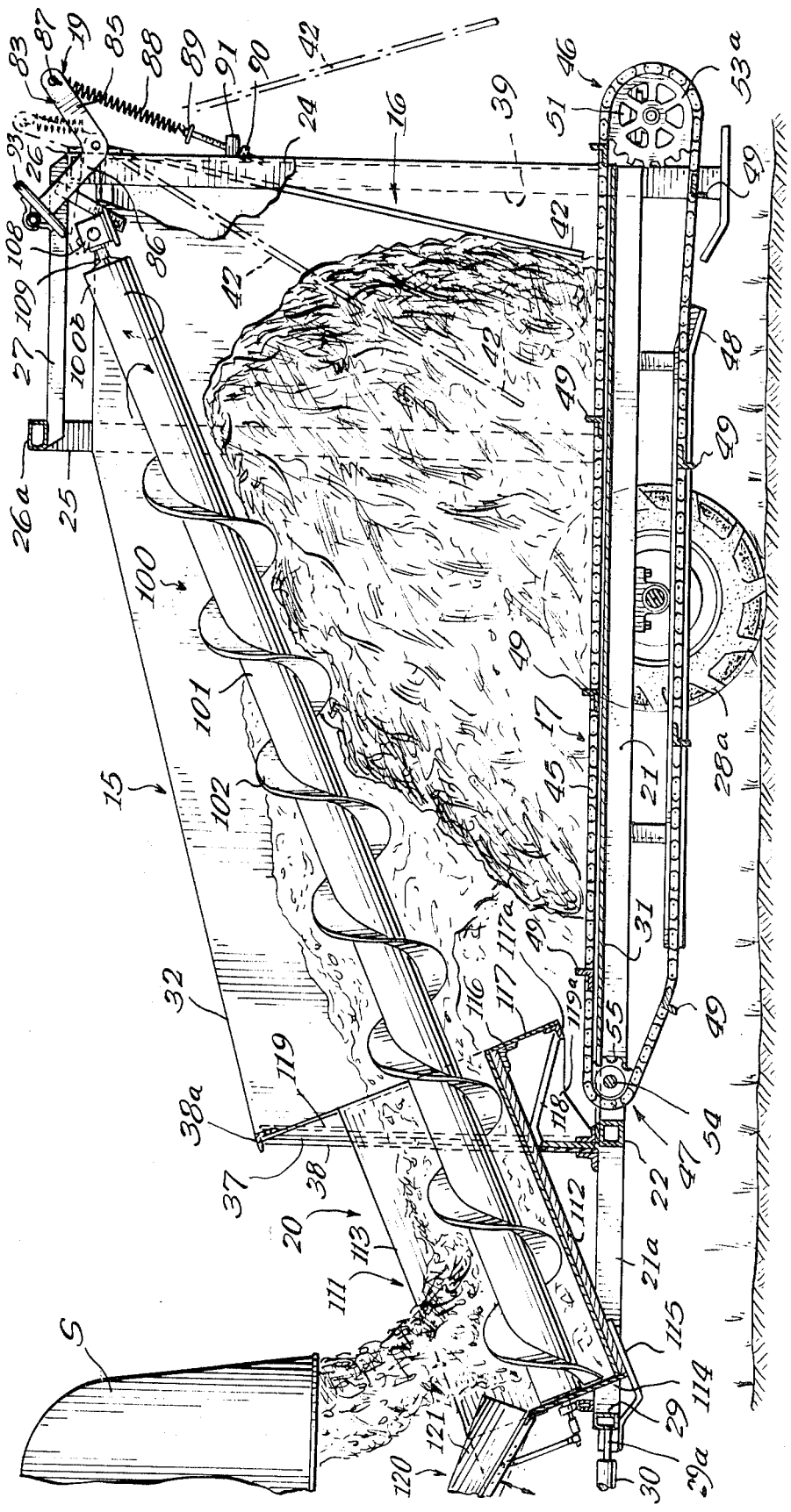

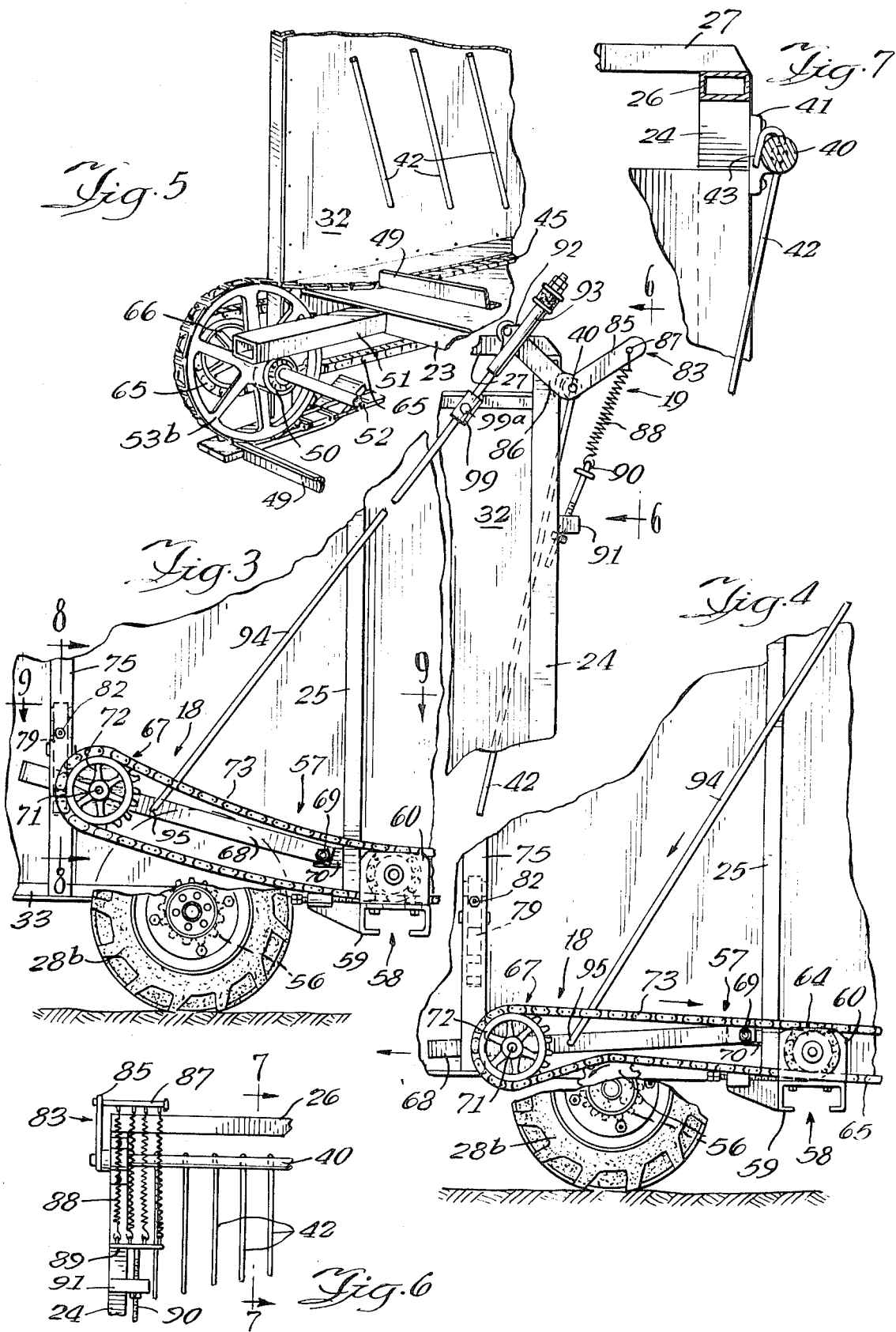

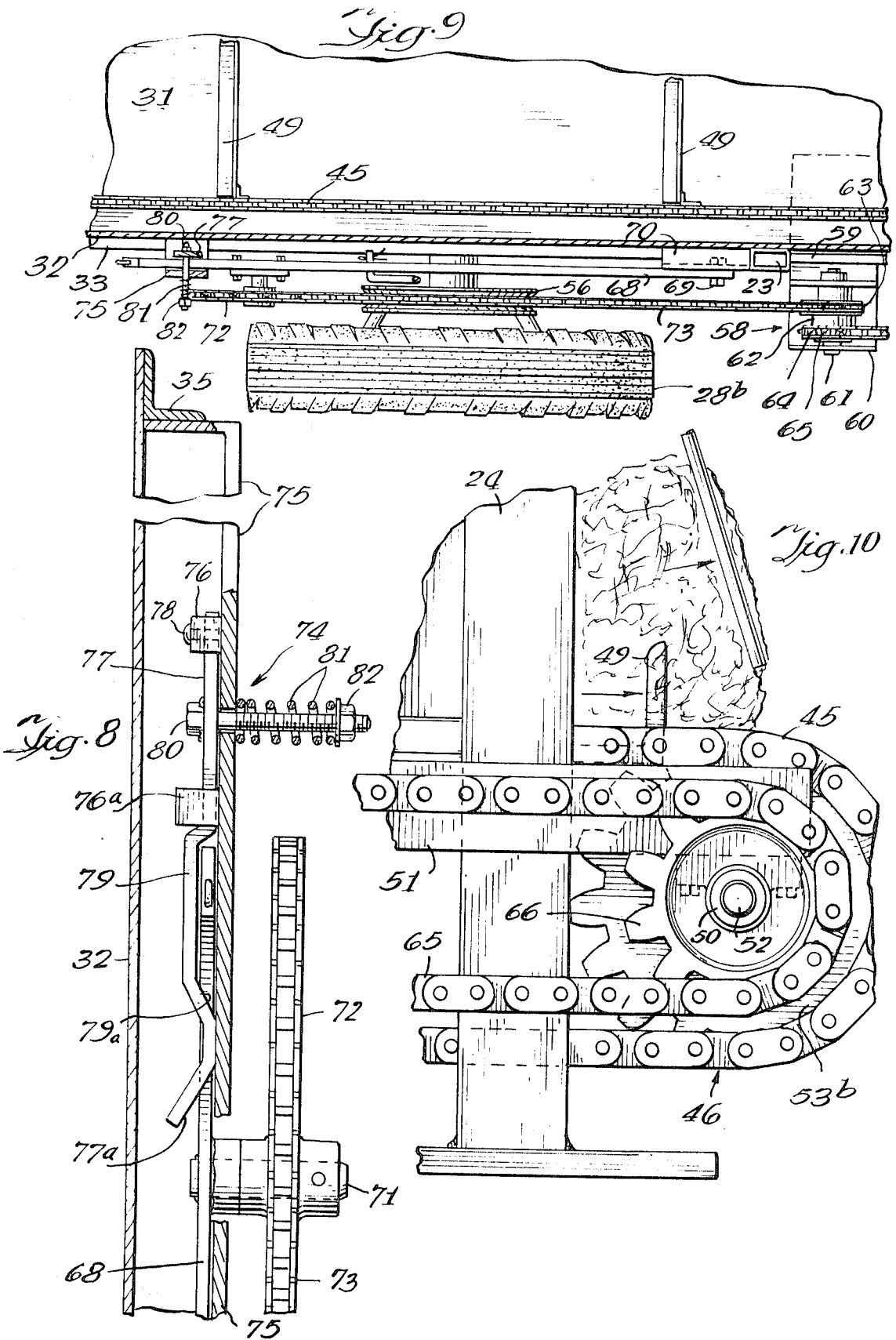

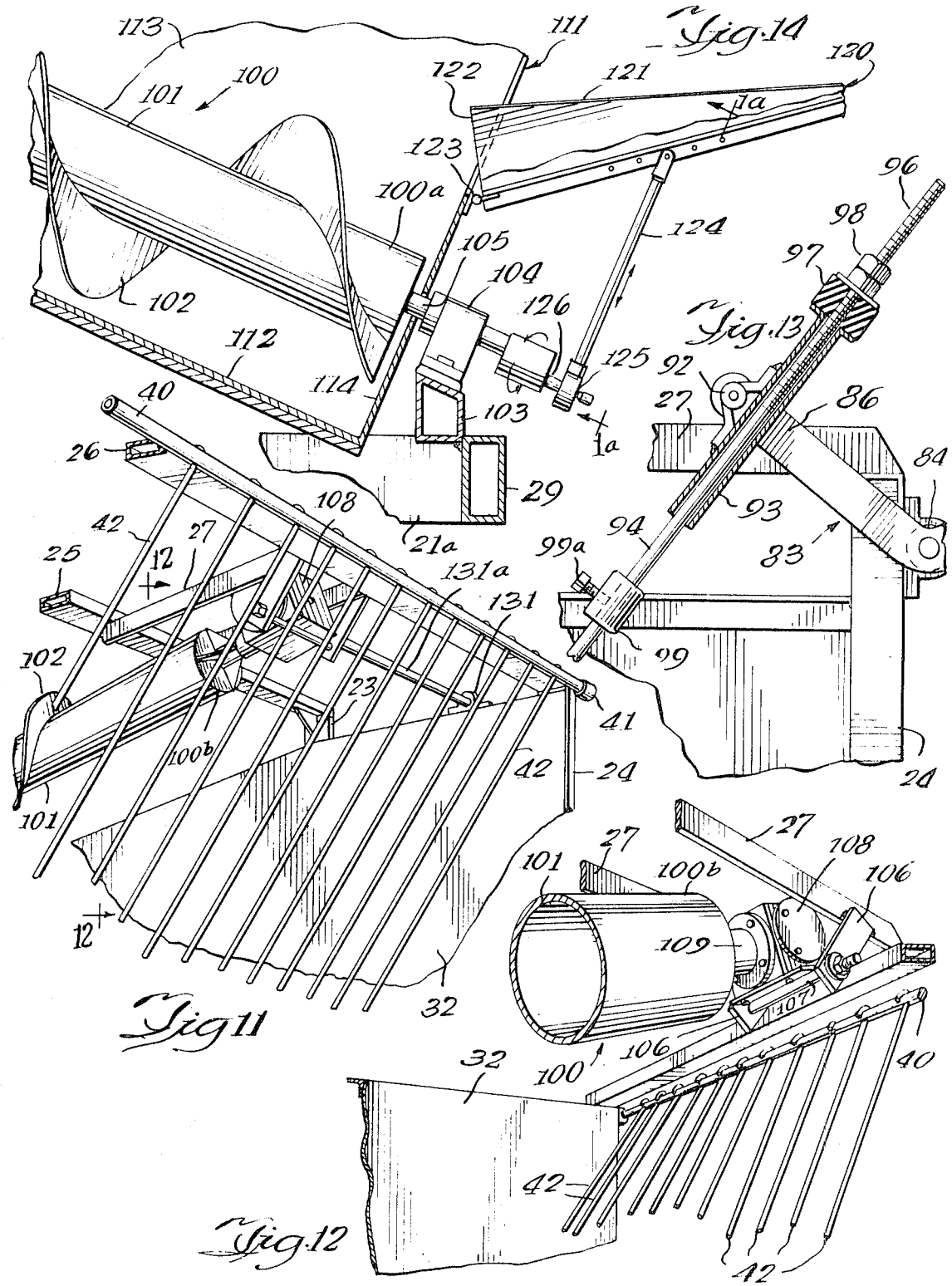

3,584,448

STRAWBUNCHER

BACKGROUND OF THE INVENTION

The present invention relates to a fodder bunching apparatus which is adapted to be towed behind a harvesting implement to receive animal fodder from the implement and drop it in a plurality of relatively small, loose bunches which are scattered about the field.

In harvesting of wheat with a combine there are three basic ways of handling the wheat straw and the chaff after the grain has been threshed from it. Often the straw and chaff is scattered loose on the ground where it may be plowed under to enrich the soil. Another practice is to leave it in windrows where it may be collected by a mechanical rake for stacking. A third practice which is becoming more and more popular is to feed the wheat straw and chaff into a buncher which collects a predetermined quantity and then dumps it in a small bunch on the field. Livestock may be permitted to eat directly from the loose bunches, or the bunches may be collected with some type of loading equipment and transported to a central stack or put through a chopper from which the chopped straw and chaff is blown into a silo or other fodder storage structure.

Similar procedures are followed in the harvesting of corn, beans, and other crops where a large part of the plant is suitable for animal fodder. Thus, a fodder buncher may be employed in corn harvesting or in the harvesting of other crops.

Heretofore, fodder bunches have been relatively crude devices using a tilting bed type of container to receive the fodder from a harvesting implement, and the tilting bed was periodically inclined to dump a bunch of collected fodder out of ground. Such machines require hydraulic lift arms for tilting the wagon, and they generally spread the material over a larger area than is desired unless forward travel of a harvesting implement with which they are used is stopped while the wagon bed is tilted.

SUMMARY OF THE INVENTION

The principal object of the present invention is to provide an improved fodder bunching apparatus which may be used in the harvesting of wheat, corn, and other crops which are used wholly or partly for fodder.

Another object of the invention is to provide a fodder buncher which functions to drop a compact bunch of fodder on the ground without the necessity for stopping forward travel of a harvesting implement with which it is used.

Yet another object of the invention is to provide a fodder buncher which is driven entirely from ground wheels so as to require no driving connection with a harvesting implement or tractor.

Yet another object of the invention is to provide a fodder buncher which may be readily adjusted to vary the amount of fodder collected in the buncher container before the bunch is dropped out of the container onto the ground.

In accordance with the present disclosure, a wheeled container having a floor and an open rear end is provided with a draft tongue by means of which it may be drawn behind a harvesting implement traveling over a field. On the floor of the container is a normally idle apron or ladder type conveyor which may be intermittently driven to move a collected bunch of fodder out of the open end of the container onto the ground. A barricade which normally closes the rear end of the container is adapted to move automatically to an open position when pressure exerted on the barricade by collecting fodder reaches a predetermined level which may be readily adjusted. Movement of the barricade to open position automatically engages a drive for the conveyor which feeds the collected fodder rapidly out the open rear end of the container.

The fodder buncher also includes an infeed conveyor auger which has its forward end ahead of the container above the draft means at about floor level and which has its rear end at the rear of the container a substantial distance above the floor. A trough which is beneath the forward portion of the auger, ahead of the container, terminates immediately inside the front of the container so that all of the auger above the container floor is exposed and fodder which is dropped into the front end portion of the auger conveyor by the harvesting implement is thus scattered generally along the entire length of the container floor.

Fodder discharged from the harvesting implement drops onto a feed pan which is positioned above the forward end of the auger conveyor, and means is provided for oscillating the feed pan so as to agitate the fodder entering the auger.

The drive for the auger and for the discharge conveyor is preferably off the ground wheels which support the container; and the entire mechanism is mechanically operated so as to require no hydraulic connections.

DESCRIPTION OF THE DRAWINGS

FIG. 1 is an elevational view of the right side of the fodder bunching apparatus;

FIG. 1a is a fragmentary sectional view on an enlarged scale taken substantially as indicated along the line 1a–1a of FIG. 1 and FIG. 14;

FIG. 2 is a longitudinal sectional view looking toward the right side, with the adjustable barricade in solid lines in an average closed position, in dash lines in a maximum closed position, and in dot - dash lines in open position;

FIG. 3 is a fragmentary side elevational view showing the discharge conveyor drive in idle position and the conveyor drive engaging means;

FIG. 4 is a view similar to a part of FIG. 3 illustrating the discharge conveyor drive in driving position;

FIG. 5 is a fragmentary perspective view of one corner of the rear of the container showing the discharge conveyor and the lower portion of a part of the barricade;

FIG. 6 is a fragmentary rear elevational view taken substantially as indicated along the line 6–6 of FIG. 3;

FIG. 7 is a fragmentary sectional view on an enlarged scale taken substantially as indicated along line 7–7 of FIG. 6;

FIG. 8 is a fragmentary sectional view on an enlarged scale taken substantially as indicated along line 8–8 of FIG. 3;

FIG. 9 is a fragmentary sectional view on an enlarged scale taken substantially as indicated along line 9–9 of FIG. 3;

FIG. 10 is a fragmentary side elevational view on an enlarged scale showing a part of the outfeed conveyor drive and the lower end of the barricade;

FIG. 11 is a fragmentary perspective view taken at the rear of the container, showing the upper portion of the barricade, the pivot shaft of the barricade, and the mounting for the rear end of the infeed conveyor;

FIG. 12 is a view of the same general area illustrated in FIG. 11, on an enlarged scale, taken substantially as indicated along the line 12–12 of FIG. 11;

FIG. 13 is an enlarged fragmentary sectional view illustrating the adjustment for the outfeed conveyor drive engaging member; and FIG. 14 is a fragmentary sectional view on an enlarged scale illustrating the forward portion of the infeed conveyor auger and the feed pan.

DETAILED DESCRIPTION OF THE INVENTION

Referring to the drawings in greater detail, and referring first to FIGS. 1 and 2, the fodder buncher of the present invention consists generally of a container, indicated generally at 15; a barricade indicated generally at 16; normally idle outfeed conveyor means, indicated generally at 17; drive means for the outfeed conveyor means, indicated generally at 18 and best seen in FIGS. 3 and 4; barricade control and drive engaging means, indicated generally at 19, for controlling movement of the barricade 16 between a closed position and an open position as illustrated in FIG. 2, and for engaging the conveyor drive means; and infeed conveyor means indicated generally at 20.

The container 15 includes a frame consisting of a pair of parallel longitudinal frame members 21 which are connected by a transverse front frame member 22 and a transverse rear frame member 23 (FIGS. 1, 2 and 14), and there are also vertical rear frame members 24 and intermediate frame members 25 the upper ends of which are tied together, respectively, by transverse bar means 26 and 26a. Longitudinal upper frame members 27 connect the bar means 26 and 26a to provide a support for the rear end of the infeed conveyor means 20. The container is supported upon a right-hand ground wheel 28a and a left-hand ground wheel 28b.

The longitudinal frame members 21, forward of the front frame member 22, have converging portions 21a which are connected by a draft bar 29 at the center of which is an eye-and-pin attaching means 29a for an adjustable draft connector 30 by means of which the fodder buncher is towed behind a harvesting implement.

Supported upon the longitudinal frame members 21 and the front and rear frame members 22 and 23 is a sheet metal floor 31, and sheet metal sides 32 which flank the floor 31 are braced by lower side angle irons 33, by front angle irons 34, by longitudinal intermediate angle irons 35, by inclined top angle irons 36 which merge at their rear ends into horizontal top angle irons 36a, and by upright intermediate angle irons 34a. Spaced front wall panels 37 flank the infeed conveyor 20 as seen in FIG. 2, their inner margins are secured to vertical angle irons 38, and their upper ends are connected by a cross iron 38a. The rear of the container 15, between the vertical rear frame members 24, is open as indicated by the reference numeral 39 in FIG. 2.

As best seen in FIGS. 2, 7, 11 and 12, the barricade 16 consists of a transversely extending pivot shaft 40 which is pivotally mounted in bearing brackets 41 that are secured to the upper ends of the vertical rear frame members 24 so that the pivot shaft is at the top of the sidewalls 32 and a substantial distance above the floor 31. The pivot shaft 40 is diametrically bored at irregular intervals to removably receive the barricade rods 42 the upper ends of which are hooked around the forward portion of the pivot shaft as seen at 43 in FIG. 7 so that, although the barricade rods are held firmly and rigidly in the pivot shaft they are readily removable in case of breakage. As best seen in FIGS. 2 and 5, the lower end of the barricade rods 42 are free, and clear the floor 31 by a few inches.

The outfeed conveyor means 17 is best seen in FIGS. 2 and 5 to be a ladder-type conveyor which includes the usual parallel conveyor chains 45 which are trained around rear sprocket means, indicated generally at 46, and front sprocket means, indicated generally at 47, so as to have an upper or conveying run in which they are supported on the floor 31 of the container 15, and a return run in which they are supported upon guide rails 48. The usual angle members 49 are connected to the chains 45 and extend across the floor of the container.

As best seen in FIG. 5, the rear sprocket means 46 includes bearing blocks 50 which are mounted on rearwardly extending brackets 51 and journal a rear sprocket shaft 52 the ends of which project outwardly through the bearing blocks 50 to fixedly receive a right rear conveyor sprocket 53a and a left rear conveyor sprocket 53b, which is an input sprocket, around which the chains 45 are trained. The front sprocket means 47 includes a transverse shaft 54 which is fixedly mounted in the longitudinal frame beams 21 immediately forward of the front end of the container floor 31, and front idler sprockets 55 are journaled on the shaft 54 to carry the forward ends of the chains 45.

As best seen in FIGS. 3, 4, 8, 9 and 10, the drive means 18 for the outfeed conveyor 17 includes a drive sprocket 56 which is secured to the hub of the left-hand ground wheel 28b so as to rotate whenever the buncher is in motion. Normally idle power transmitting means, indicated generally at 57, is adapted to be moved from the idle position illustrated in FIG. 3 to the driving position illustrated in FIG. 4 by operation of the barricade control and drive operating means 19.

The normally idle power transmitting means is best seen in FIGS. 3, 4, 8 and 9 to include an intermediate sprocket assembly, indicated generally at 58, which is mounted upon a laterally projecting bracket 59. The intermediate sprocket assembly 58 includes a sprocket carrier 60 which is mounted for longitudinal sliding movement on the bracket 59 so that it may be adjusted within limits, and supported in the sprocket carrier 60 is a spindle 61 on which is journaled a hub 62 which fixedly supports an input sprocket 63 and an output sprocket 64. A drive chain 65 is trained around the output sprocket 64 and around a drive sprocket 66 which is keyed to the outfeed conveyor input sprocket 53b as seen in FIG. 10.

The normally idle power transmitting means 57 also includes a selectively engageable drive chain assembly, indicated generally at 67, which comprises a sprocket arm 68 that is pivoted at 69 on a bracket 70 which projects forwardly from the intermediate vertical frame member 25. A stub shaft 71 mounted on the sprocket arm 68 carries a sprocket 72 around which is trained a selectively engageable drive chain 73 which is also trained around the input sprocket 63 of the sprocket assembly 58 so when the selectively engageable chain 73 is in the position of FIG. 4, engaged with the constantly driven drive sprocket 56, power is transmitted through the chain 73 and the chain 65 to drive the outfeed conveyor 17.

As best seen in FIGS. 8 and 9, the sprocket arm 68 is normally held in the elevated position of FIG. 3 by a latch means, indicated generally at 74, which includes an upright bracket 75 the upper end of which is welded to the longitudinal intermediate side angle iron 35 and the lower end of which is connected to the lower side angle iron 33, as seen in FIG. 9. A U-shaped strap 76 which is welded to the inner face of bracket 75 provides a mounting for the upper end of a spring latch arm 77 which is pinned at 78 to the strap 76 and is confined by a second U-shaped strap 76a. The spring latch arm 77 has an offset detent portion 79 adjacent its lower end to receive the free end of the sprocket arm 68. A bolt 80 extends through the spring latch arm 77 and through a hole in the upright bracket 75 to receive coil spring 81 which is compressed between the bracket 75 and a spring retaining nut 82. Thus, the spring latch arm 77 holds the sprocket arm 68 in the elevated, disengaged position of FIG. 3; and the force required to free the arm 68 from the spring arm 77 is determined by the adjustment of the spring retaining nut 82. The offset 79 of the spring retaining arm 77 has a lower cam surface 79a, and the lower end of the spring arm 77 flares outwardly at 77a, to facilitate movement of the sprocket carrying arm 68 between the elevated idle position of FIG. 3 and the lowered driving position of FIG. 4.

As best seen in FIGS. 2, 3 and 13, a barricade control and drive engaging means 19 includes a bellcrank lever, indicated generally at 83, which has its fulcrum 84 welded to the pivot shaft 40 of the barricade, and the bellcrank has a first arm 85 which extends rearwardly and upwardly and a second arm 86 which extends forwardly and upwardly. As best seen in FIG. 6, a transverse spring bar 87 is fixedly secured to the outer end of the bellcrank arm 85, and a set of tension springs 88 is stressed between the bar 87 and a spring retainer 89 which makes a turn buckle connection 90 with a spring bracket 91 so that the tension of the spring set 88 may be varied by means of the turn buckle connection. The second arm 86 of the bellcrank is best seen in FIG. 13 to carry a pivotal connection 92 for a sleeve 93 which slidably receives the upper end of a push rod 94 the lower end of which is pivotally connected at 95 to the sprocket arm 68 so that endwise force exerted on the rod 94 may disengage the arm 68 from the spring latch arm 79. The upper end portion of the push rod 94 is threaded at 96 to receive an adjusting nut 97 and lock nuts 98 so that movement of the adjusting nut 97 changes the effective length of the push rod 94 and thus varies the normal orientation of the bellcrank 83 and the angle assumed by the barricade 16 in its closed position.

As the container 15 fills with fodder, as seen in FIG. 2, the pressure of fodder against the gate rods 42 gradually turns the pivot rod 49 and swings the bellcrank 83 in a counterclockwise direction until the rod 87 to which the upper end of the spring set 88 is connected moves over center, at which point the spring set rapidly swings the barricade to its open position. When this occurs the bellcrank drives the sleeve 93 downwardly along the push rod 94 until the sleeve strikes an actuator collar 99 on the push rod 94 to drive the push rod downwardly and forcibly eject the sprocket arm 68 from the spring latch detent 79 so that the selectively engageable chain 73 may engage the constantly driven sprocket 56 as seen in FIG. 4. This operates the outfeed conveyor 17 to feed the fodder collected in the container out the open rear end 39 of the container onto the ground.

The actuator collar 99 is adjustably secured to the push rod by a setscrew 99a, so that the spacing between the lower end of the sleeve 93 and the collar may be adjusted to produce the required ejection of the sprocket arm 68 from the detent 79.

Disengagement of the outfeed conveyor drive chain 73 from the sprocket 56 and return of the barricade 16 to its closed position, is manually effected by a cord (not shown) which is secured to the free end of the sprocket arm 68 and passes over pulleys (not shown) near the top of the sidewall 32. The cord extend s forwardly to a position where it may be pulled by the person operating the harvester implement.

Referring now particularly to FIGS. 2, 11, 12 and 14, the infeed conveyor means 20 comprises an auger, indicated generally at 100, which includes a tubular shaft 101 and a helical rib 102. The auger conveyor 100 is supported in an inclined position with its lower end 100a generally coplanar with the floor of the container and its upper end 100b generally in the same plane as the barricade pivot shaft 40. As best seen in FIG. 14, a lower auger supporting member 103 extends between the convergent forward portions 21a of the longitudinal frame members 21 and is welded to the draft bar 29 to support a bearing 104 in which a lower auger spindle 105 is journaled. Support for the upper end of the auger includes a pair of arms 106 which are welded to the upper frame members 27 and carry a crossrod 107 on which is mounted drive gear box 108 the output shaft of which is splined to an upper auger spindle 109.

As best seen in FIGS. 2 and 14, associated with the lower end portion of the auger 100 is an infeed trough, indicated generally at 111, which is in the form of a broad, shallow U that includes a bottom wall 112, sidewalls 113 the upper edges of which abut the front panels 37 of the container, and a lower end wall 114 which is apertured to accommodate the lower auger spindle 105. The lower end of the trough 111 is supported upon a bracket 115 which is connected to the convergent forward portions 21a of the longitudinal frame members 21 and to the draft bar 29.

The upper, or inner end of the trough 111 is supported in an angle iron cradle 116 which is bent to the shape of the trough and has its ends welded to the vertical angle irons 38. Thus, the cradle 116 is generally in the shape of a broad, shallow U; and a filler plate 117 which has angle iron side frame members 117a across its lower end and up its two sides is inclined downwardly and forwardly from the cradle 116 perpendicular to the axis of the auger 100. The filler plate 117 terminates above the plane of the ladder members 49 of the outfeed conveyor 17 where they make their conveying run along the floor 31 of the container, and an inclined tie bar 118 is welded to the bottom angle frame 117a and to the bottom 112 of the trough 111. Generally triangular side filler panels 119 close the space between the lateral margins of the inclined panel 117 and the front wall panels 37. The lower ends of the filler panels are cut away as seen at 119a to provide clearance for the ladder members 49.

The infeed conveyor trough 111, across its upper edges, is more than half the width of the container 15 so as to provide a wide receiving trough for fodder.

As seen in FIGS. 1a, 2 and 14, material agitating means, indicated generally at 120, includes a broad, shallow V-shaped pan 121 which is as wide as the trough 111 and which is mounted in an inclined position with respect to the trough with its rear end 122 hinged at 123 to the upper edge of the trough front wall 114. As seen in FIG. 2, the discharge spout S of a harvesting implement discharges fodder onto the pan 121, and in order to agitate the fodder as it is fed into the auger conveyor 100 the pan 121 is seen in FIG. 1a to have parallel flanges 121a along the centerline to loosely receive a pivot 124a for a crank shaft 124 the lower end of which is journaled at 125 upon an eccentric shaft 126 which is mounted upon the outer end of the lower auger spindle 105. Thus, as long as the auger is rotating the eccentric shaft 126 and the crank shaft 124 cause the pan 121 to rock about the hinge 123.

The drive for the auger 100 is seen in FIG. 1 to include a sprocket 127 which is pinned to the hub of the right-hand ground wheel 28a, and an input sprocket 128 journaled upon a stub shaft 129 carries a drive chain 130 which engages the sprocket 127 and extends diagonally upwardly and rearwardly where its upper end is trained around an input sprocket 131 which is seen in FIG. 11 to be keyed to a transverse input shaft 131a of the gear box 108. A slidably mounted chain tensioning arm 132 carries a tensioning sprocket 133 by means of which the chain is retained in driving engagement with the sprocket 127. Thus, as long as the fodder buncher is in motion the auger conveyor 100 and feed pan 121 are driven through the drive system just described.

The foregoing detailed description is given for clearness of understanding only and no unnecessary limitations are to be understood therefrom, as some modifications will be obvious to those skilled in the art.

We claim:

1. In a fodder bunching apparatus which includes a wheeled container having a floor and an open rear end, said container being adapted to be towed behind a harvesting implement to receive and collect animal fodder from said implement as the latter is moved about a field, and means for intermittently dumping collected animal fodder from the rear end of the container to leave a plurality of relatively small, loose bunches of fodder in the field, the improvement comprising:
   a movable barricade normally closing the open rear end of the container;
   normally idle conveyor means on the floor of the container for moving collected fodder out of said open rear end;
   drive means for said conveyor means;
   barricade control means for controlling movement of said barricade between closed and open positions;
   and means for operating said drive means in coordination with the movement of said barricade to open position to cause the conveyor means to move collected fodder out of the container when the barricade is in said open position.

2. The apparatus of claim 1 which includes transversely extending pivotal mounting means for the barricade positioned a substantial distance above the container floor, and in which the barricade control means includes means for pivoting the barricade to swing its lower end rearwardly to open position.

3. The apparatus of claim 2 in which the barricade control means also includes means for retaining the barricade in its closed position against the pressure exerted on it by fodder collecting in the container, said retaining means releasing the barricade for movement to open position when pressure exerted on the barricade by said collecting fodder reaches a predetermined level.

4. The apparatus of claim 3 which includes means for adjusting the pressure level at which the retaining means releases the barricade.

5. The apparatus of claim 3 in which the pivotal mounting means for the barricade comprises a pivot shaft, and in which the retaining means comprises a lever secured to the pivot shaft and prestressed spring means which is to one side of an extended dead center position when the barricade is closed and which is moved by the pressure of fodder on the barricade through said dead center position, said spring means past said dead center position acting to pivot the barricade shaft rapidly to move the barricade to open position.

6. The apparatus of claim 5 which includes means for adjusting the prestress of the spring means to vary the pressure level of fodder required to move the spring means through the dead center position.

7. The apparatus of claim 5 in which the lever is a bellcrank fulcrumed on the pivot shaft, the spring means are connected to one arm of the bellcrank, and a drive engaging member is connected to the other arm of the bellcrank to mechanically engage the drive means when the springs move past dead center position.

8. The apparatus of claim 7 in which the drive means includes a constantly driven member, normally idle power transmitting means operatively connected to the conveyor means, and means for operatively engaging the power transmitting means with the driven member in response to movement of the drive engaging member.

9. The apparatus of claim 3 which includes a movable drive engaging member operatively connected to the barricade, to mechanically engage the drive means when the barricade moves to open position.

10. The apparatus of claim 1 in which the barricade control means comprises means for retaining the barricade in its closed position, said retaining means releasing the barricade for movement to open position in response to a predetermined condition.

11. The apparatus of claim 10 in which the retaining means is constructed to release the barricade in response to the presence in the container of a predetermined general quantity of fodder.

12. The apparatus of claim 11 which includes means for adjusting the quantity of fodder required to release the barricade.

13. The apparatus of claim 1 in which the barricade comprises a transverse bar, means pivotally mounting said bar a substantial distance above the container floor, and a plurality of depending generally parallel rods which are fixedly mounted on said bar and have free lower ends.

14. The apparatus of claim 13 in which, when the barricade is in closed position, the rods are forwardly inclined with respect to the transverse bar.

15. The apparatus of claim 1 which includes infeed conveyor means having an upwardly open front end portion which is forward of the container to receive fodder from the harvesting implement, said infeed conveyor means extending longitudinally above the container floor to drop fodder onto the floor.

16. The apparatus of claim 15 in which the infeed conveyor means includes an auger which extends from a point forward of the container substantially to the rear end of the container, and an upwardly open trough surrounding the forward portion of the auger and extending a short distance into the container so the auger may scatter fodder along the container floor forward of said trough.

17. The apparatus of claim 16 in which the trough is of a shallow U-shape and has sidewalls that span more than half the width of the container.

18. The apparatus of claim 16 in which the auger is upwardly inclined from front to rear, the front end of the auger being generally coplanar with the container floor and the rear end of the auger being generally coplanar with the top of the barricade.

19. The apparatus of claim 15 in which the infeed conveyor extends substantially to the rear of the container and is adapted to scatter fodder along the container floor.

20. The apparatus of claim 15 which includes means at the front end of the infeed conveyor means for agitating material received from the harvesting implement as such material enters the infeed conveyor.

21. The apparatus of claim 20 in which the material agitating means comprises a tray and means for oscillating the tray.

22. The apparatus of claim 21 in which the infeed conveyor includes an auger having a shaft which is journaled below the tray, and the tray oscillating means comprises an eccentric on said shaft and a link from said eccentric to the tray.

23. In a fodder bunching apparatus which includes a wheeled container having a floor and an open rear end, said container being adapted to be towed behind a harvesting implement to receive and collect animal fodder from said implement as the latter is moved about a field, and means for intermittently dumping collected animal fodder from the rear end of the container to leave a plurality of relatively small, loose bunches of fodder in the field, the improvement comprising: infeed conveyor means having an upwardly open front end portion which is forward of the container to receive fodder from the harvesting implement, said infeed conveyor means extending longitudinally above the container floor to drop fodder onto the floor.

24. The apparatus of claim 23 in which the infeed conveyor means includes an auger which extends from a point forward of the container substantially to the rear end of the container, and an upwardly open trough surrounding the forward portion of the auger and extending a short distance into the container so the auger may scatter fodder along the container floor to the rear of said trough.

25. The apparatus of claim 24 in which the trough is of a shallow U-shape and has sidewalls that span more than half the width of the container.

26. The apparatus of claim 23 in which the auger is upwardly inclined from front to rear, the front end of the auger being generally coplanar with the container floor and the rear end of the auger being generally coplanar with the top of the barricade.

27. The apparatus of claim 23 in which the infeed conveyor extends substantially to the rear of the container and is adapted to scatter fodder along the container floor.

28. The apparatus of claim 23 which includes means at the front end of the infeed conveyor means for agitating material received from the harvesting implement as such material enters the infeed conveyor.

29. The apparatus of claim 28 in which the material agitating means comprises a tray and means for oscillating the tray.

30. The apparatus of claim 29 in which the infeed conveyor includes an auger having a shaft which is journaled below the tray, and the tray oscillating means comprises an eccentric on said shaft and a link from said eccentric to the tray.

31. The apparatus of claim 23 which includes means for sensing generally the amount of fodder in the container, and means responsive to operation of said sensing means for intermittently dropping collected fodder from the container.

32. The apparatus of claim 31 in which the means for sensing generally the amount of fodder in the container comprises a barricade normally closing the rear end of the container, and means operatively associated with said barricade which senses the rearward pressure of collected fodder on the barricade and moves the barricade to open position when said pressure reaches a predetermined level.

33. The apparatus of claim 32 in which the means operatively associated with the barricade may be adjusted to move the barricade to open position at different levels of pressure on the barricade.

34. The apparatus of claim 32 in which the barricade is mounted on a transverse pivot shaft above the container floor, and the means operatively associated with the barricade comprises a lever secured to said shaft and spring means which is to one side an extended dead center position when the barricade is closed and which is moved by the pressure of fodder on the barricade through said dead center position, said spring means past said dead center position acting to pivot the barricade shaft rapidly to move the barricade to open position.